Jan. 26, 1943.  H. W. ALDEN  2,309,432
MOTOR VEHICLE
Filed Sept. 21, 1940  4 Sheets-Sheet 4

Inventor
Herbert W. Alden
By
Strauch & Hoffman
Attorneys

Patented Jan. 26, 1943

2,309,432

UNITED STATES PATENT OFFICE 2,309,432

MOTOR VEHICLE

Herbert W. Alden, Detroit, Mich., assignor to The Timken-Detroit Axle Company, Detroit, Mich., a corporation of Ohio Application September 21, 1940, Serial No. 357,801

9 Claims. (Cl. 74—314)

The present invention relates to motor vehicles, and more particularly to motor vehicles having driving axles both front and rear, known in the art as four wheel drive vehicles. Although it finds particular application to that class of vehicles, it is not limited to such use.

The most serious problem in four wheel drive vehicles is to achieve a front drive axle of adequate torque capacity to handle the load and yet which is sufficiently compact to avoid blocking up the chassis frame excessively to provide the necessary clearance between the oil pan of the engine and the axle. The difficulties are increased when it is desired to convert a stock two wheel drive vehicle into a four wheel drive vehicle. In such instances the clearances of the engine and other parts are merely designed for a dead front axle, and are accordingly small, and it is found that in some conversion installations it is necessary to block up the front end of the frame so far as to seriously impair the balance and efficiency of the vehicle when a conventional front drive axle is used.

In Keese Patent No. 2,071,537, granted February 23, 1937, there is disclosed a front drive axle in which the enlarged or differential portion of the axle housing is transversely split and is so shaped that it may fit up between the chassis frame and the engine oil pan. Although that construction has been found to be rather satisfactory in certain types of vehicles, and represents a great advance in the art over the banjo type housing heretofore used in front drive axles, it is not applicable to all types of vehicles, particularly certain conversion installations, where over-axle space is at a premium, and, also, vehicle parts other than the engine oil pan often occupy the space above the axle and present serious problems when a conversion is made.

It is accordingly the major object of this invention to provide front drive axles which are compact, efficient and have sufficiently small overall vertical dimensions that they may be readily substituted for the dead front axle of a conventional vehicle with a minimum of blocking up of the vehicle frame to provide adequate clearance with respect to the vehicle engine and/or other over-axle parts, and at the same time have good road clearances.

Another important object is to provide a novel motor vehicle having a single reduction rear axle and a front drive axle embodying double reduction gearing having an overall speed reduction equal to that of the rear axle, and also being of compact construction, requiring a minimum of over axle clearance.

A further object is to provide drive axles having a two part housing divided into a casing section and a cover section along a plane transverse to the axle, and embodying double reduction gearing journalled in the casing section and cover.

Another object is to provide drive axles having a housing section closed by a cover disposed normal to the axle, axle arms rigidly carried by the housing and cover, and double reduction gearing journalled at one end in the housing and at the other end in the cover.

A further object is to provide drive axles having novel means for selectively interrupting the drive from the propeller shaft to the axle shafts.

Another object is to provide drive axles having double reduction gearing, with clutch means for selectively uncoupling one of the gears from its shaft, so as to interrupt the drive from the drive shaft to the axle shaft.

The invention also aims to provide novel cross-shaft assemblies for double reduction axles and to generally improve and refine the bearing arrangements, gear mountings and other subordinate features of such axles, which result in increased efficiency, decreased weight and overall dimensions, and yet do not impair the torque capacity of the axles.

Further objects of the invention will become apparent as the specification proceeds in connection with the annexed drawings, and from the appended claims.

With continued reference to the drawings, in which similar reference characters have been employed to designate like parts throughout the several views thereof, the vehicle illustrated comprises a chassis frame 10, to which a front drive axle F and a rear drive axle R are connected by springs S in well-known manner. The axles carry vehicle wheels W, as is well understood in the art.

Figures 1, 2:
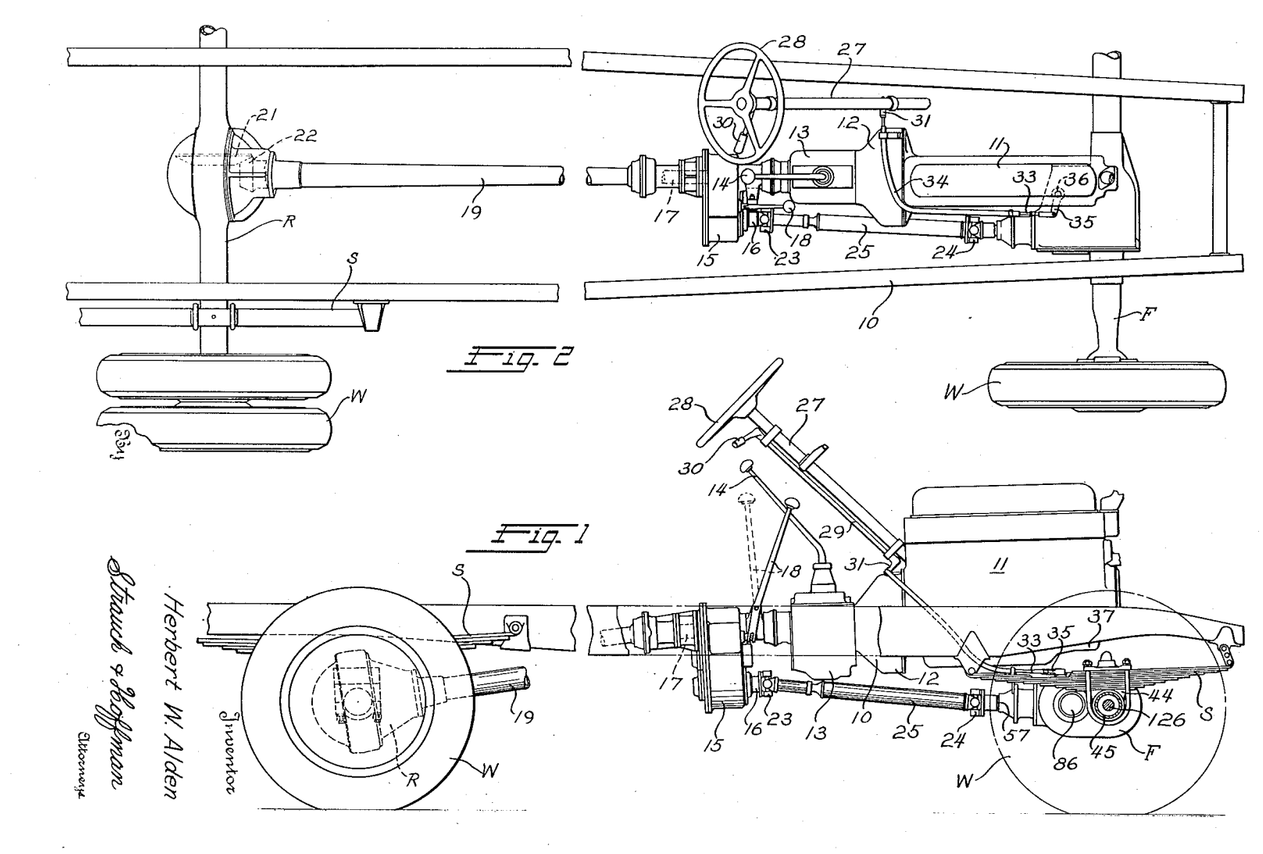
Figure 1 is a longitudinal sectional view, somewhat diagrammatic in form, of a motor vehicle embodying the invention.
Figure 2 is a top plan view of the vehicle shown in Figure 1.

An engine 11 is connected to a clutch 12 and transmission 13 having a gear shift lever 14 in well-known manner. The transmission transmits power to a transfer case 15 of any suitable form. Preferably it is designed to transmit power at either of two gear ratios, in the same direction and at the same speed to a front delivery shaft 16 and a rear delivery shaft 17, and is adapted to be shifted into the high or low ratio by a gear shift member 18, which, as shown in Figure 2, is in the high ratio position. Output shaft 17 delivers power through a torque tube drive 19 to the pinion 22 of the rear axle. Pinion 22 meshes with a bevel gear 22 and delivers power to the axle shafts of the rear axle in well-known manner.

Front power delivery shaft 16, operating through universal joints 23 and 24 and a propeller shaft 25, transmits power to front axle F. An important feature of the invention resides in embodying two sets of reduction gears in the front axle which effect an overall speed reduction equal to that of the single set of speed reducing gears in the rear axle, as will hereinafter more fully appear.

A steering column 27, having the usual steering wheel 28, is provided with a shaft 29 having an operating lever 30 at the upper end thereof. Shaft 29 carries a lever 31 at its lower end which is connected to a longitudinally slidable cable 33 mounted in a sheath 34, the latter constituting the well-known Bowden cable assembly. The other end of cable 33 is connected to a lever 35 carried by a shaft 36 in the front axle housing, and the parts are so designed that, when lever 30 is pulled down, cable 33 is pulled rearwardly and lever 35 rocked so as to engage a clutch in the front axle and effect a drive between the front wheels and the propeller shaft 25, as will hereinafter appear.

From the foregoing it is apparent that, due to the extremely compact, double reduction front axle, the vehicle frame may be brought down very close to the axis of rotation of the wheels and the oil pan 37 of the engine may directly overlie it without danger of interference, even in response to extreme spring deflection. By properly selecting the gears of the front axle, the overall reduction may be made equal to the reduction of the single set of reduction gears in the rear axle, and by matching the gear reduction of the rear axle of any particular stock car or truck, conversion installations may readily be made.

A further highly important factor contributing to the success of the axle, and the ease with which conversions may be made, resides in the extremely compact design of the front axle, which results in a unit which is so low as to readily clear the oil pan and other under-engine parts of most motor vehicles, making it unnecessary to allow any part of the housing to extend up between the engine and the frame, or any other parts.

Taking up the operation of the structure so far described with the shift lever 18 in the position shown in Figure 1, and lever 30 in its uppermost position, transfer case 15 establishes a direct drive between transmission 13 and the propeller shaft 19, with the result that the vehicle may be operated in conventional manner through the rear axle only, by disengaging clutch 12 and shifting transmission 13 into the desired gear ratios through gear shift lever 14. With the vehicle operating as just described, when heavy going is encountered, clutch 12 is momentarily declutched; lever 30 is pulled down to engage the clutch of the front axle, and clutch 12 re-engaged. With the parts operating under these conditions, the power from the engine is divided by the transfer case between the front and rear axles.

With the vehicle operating in the manner just described with the transfer case in direct of one-to-one drive, and it should be desired to obtain lower gear ratios than those provided by transmission 13, clutch 12 is momentarily disengaged and lever 18 shifted into its dotted line position, which shifts the transfer case into the low speed drive. The engine will now transmit power to the front and rear axles through shafts 16 and 17 at a reduced speed with respect to the transmission output shaft.

Since the transfer case is not claimed herein and may be of any suitable form, it will not be further described. For instance, it may assume the form shown in Ruggles et al. Patent No. 2,173,044, granted September 12, 1939, or in the application of Beverly W. Keese for Power transmitting mechanism, Serial No. 350,917, filed August 3, 1940. It may also embody a declutching device for the front axle, so that when the front axle is not being driven the propeller shaft will be stationary.

Figures 3, 4:
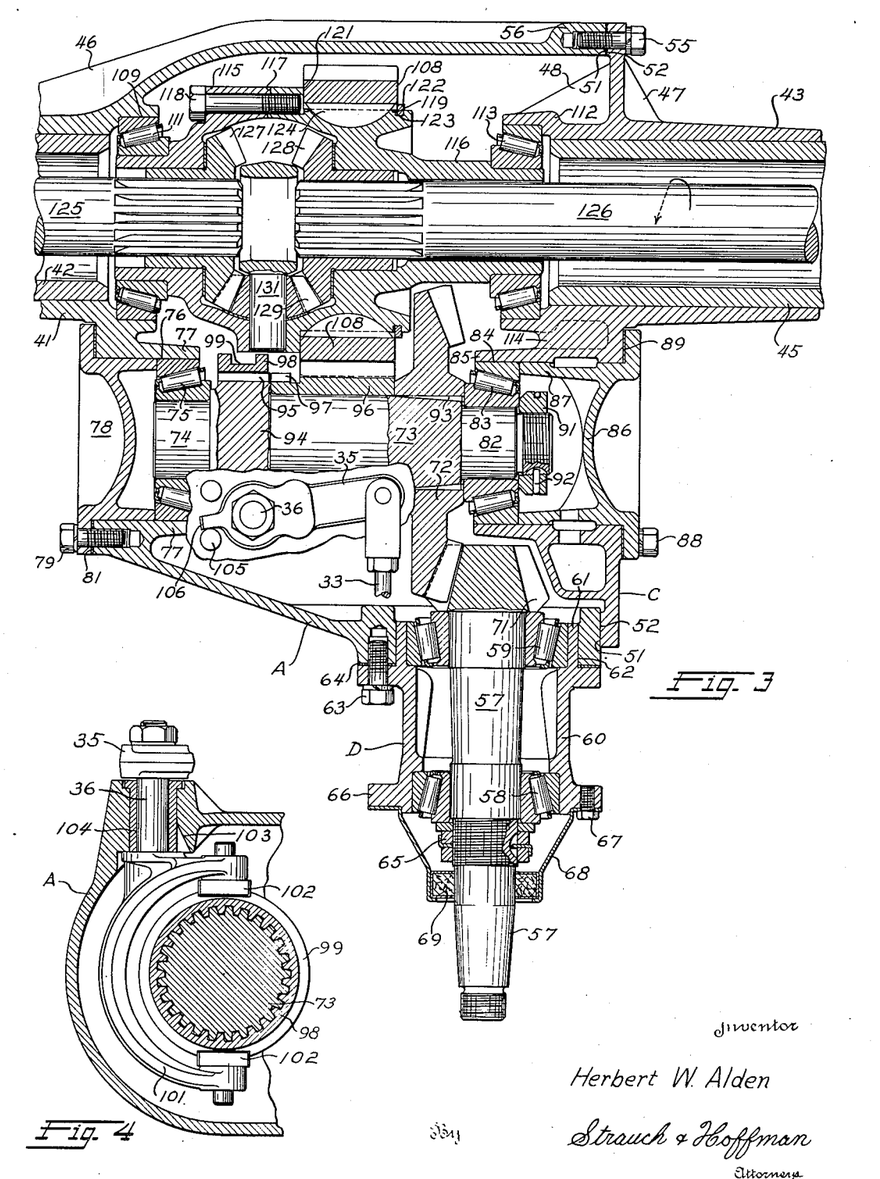
Figure 3 is a horizontal sectional view of a front drive axle embodying the invention.
Figure 4 is a transverse fragmental sectional view taken through the axle of Figure 3, showing the shifter fork assembly.
Figures 5, 6:
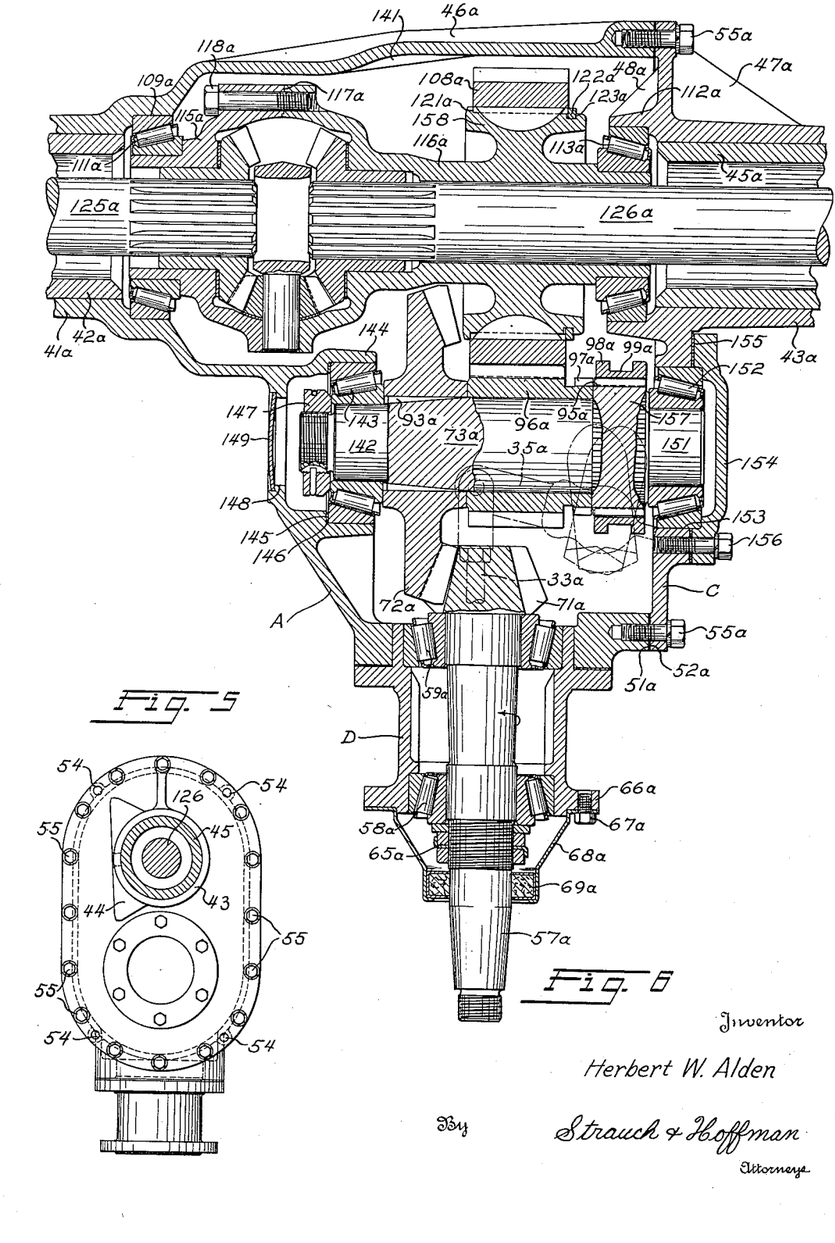
Figure 5 is an elevational view of the axle shown in Figure 3 as it appears when viewed from the right-hand side of that figure.
Figure 6 is a view somewhat similar to Figure 3, but illustrates a modification of the invention.

The novel front axle construction of the invention is shown more particularly in Figures 3, 4 and 5 and with continued reference to these figures, it comprises an open-sided main housing A, mating with a cover or complementary housing section C closing at the open side of housing A; and an auxiliary housing D, which supports the bevel pinion shaft.

Housing section A is provided with a sleeve portion 41, into which an axle arm 42 is pressed. A similar axle arm 43, that additionally carries a spring seat 44, is provided on cover section C, and an axle arm 45 is pressed into it. Axle arms 41 and 43 are reinforced by strengthening webs 46 and 47, respectively. As seen in Figure 3, webs 46 extend all the way across housing section A, and cover section C is further strengthened by an internal web 48.

Housing section A is provided with a face 51, disposed substantially normal to the axis of the axle arms, and mates with a clamping surface 52 provided on housing section C. The two faces are preferably accurately finished, then accurately located by four dowels 54 and rigidly secured together with a plurality of cap screws 55 passing through openings in section C and threaded into bosses 56 provided on section A.

Power is applied to the unit by means of a drive or propeller shaft 57 journalled in a pair of tapered roller bearings 58 and 59 in an auxiliary housing D, which is of cylindrical form and has a flange 61 piloted in an opening 62 in housing section A. Housing D is provided with a flange which is secured to the main housing by cap screws 63, a plurality of shims 64 being interposed between the parts to secure the proper pinion adjustment, as will hereinafter appear. Bearings 58 and 59 are adjusted on shaft 57 by means of a locknut assembly 65 engaging the inner race of bearing 58. Housing D is also provided with a second flange 66 for strengthening it, and secured thereto, by means of cap screws 67, is a conical sheet metal member 68, which encloses the locknut assembly and carries a seal 69 cooperating with the shaft, to prevent the escape of lubricant from the housing.

Shaft 57 carries a preferably integrally formed bevel pinion 71, which meshes with a bevel gear 72 carried by a cross-shaft or countershaft 73. The left-hand end of the countershaft has a reduced portion 74 supported in a bearing 75, and the latter is located in an accurately formed bore 76 in a shell-like support 77 integrally formed with housing A. The outer race of bearing 75 is maintained in proper axial position by a flanged cap member 78, which is secured to housing A by cap screws 79. A plurality of shims 81 are interposed between the cap and the housing to provide for axial adjustment of the countershaft, as will hereinafter appear.

The other end of the countershaft is provided with a reduced portion 82, which is supported in an anti-friction bearing 83. The latter is carried in an accurately formed bore 84 in a shell-like portion 85 of cover member C.

As seen in Figure 3, by providing an extremely long support 85, bearing 83 is located almost exactly centrally with respect to the axis of rotation of shaft 57, thereby affording excellent support for shaft 73 and materially improving the meshing of pinion 71 with bevel gear 72.

The outer race of bearing 83 is maintained in proper axial position by a cap member 86, having a deep flange 87. Cap member 86 is secured in place by cap screws 88, and shims 89 are preferably interposed between it and cover section C to secure proper axial adjustment of the bearing. The inner race of bearing 83 is held in place by a nut 91 threaded on shaft 73 and locked by a lock wire 92.

Gear 72 is secured to the countershaft by a tapered spline connection 93, and accordingly is restrained against both axial movement and relative rotation with respect thereto.

The countershaft is provided with an enlarged portion 94, carrying external teeth 95. Journalled for free rotation on the countershaft between the hub of gear 72 and enlargement 94, is a helical spur gear 96. Gear 96 is also provided with a series of external clutch teeth 97, which are equal in size and number to the external teeth of enlargement 94. Cooperating with clutch teeth 95 and 97 is an internally toothed clutch collar 98 having a shifter groove 99.

From the structure so far developed, it is apparent that drive shaft 57 is accurately mounted for rotation in the housing and transmits power to gear 72 and rotates the countershaft. The countershaft, being mounted in a bearing 83 located directly opposite the pinion, accurately maintains the meshing engagement of the gears, materially contributing to silent and efficient operation.

When the clutch 98 is in the position shown in Figure 3, the countershaft is merely idly driven without transmitting power to helical gear 96. When clutch member 98 is shifted to the right, so as to engage its internal teeth with clutch teeth 97 of gear 96, power is transmitted from the external teeth 95 of the countershaft through the clutch to clutch teeth 97, so as to rotate gear 96 at the same speed as the countershaft. It should be particularly observed that, due to the fact that the novel double reduction axle employed has a total overall speed reduction equal to the speed reduction of the single reduction rear axle, bevel gear 72 may be of comparatively small size and, by bringing the various parts together into the minimum axial space, a truly compact mechanism is achieved.

The clutch may be shifted by any suitable mechanism, but I preferably use a shift yoke 101 carrying a pair of pivoted T-shaped members 102, engaging in groove 99 of the clutch collar. Yoke 101 is provided with a shaft portion 36, journalled in a bushing 104 carried by housing A, and it is adapted to be actuated by a lever 35, which is connected to cable 33, previously described. An enlarged portion 103 is provided in housing A in order that the yoke may be rocked into place during the assembly operation and prior to application of bushing 104. A pair of stops 105 are located on the outside of the casing and cooperate with a finger 106 on lever 35 to stop the latter in either of its extreme positions.

Accordingly, by pulling down lever 30 on the steering column, cable 33 is pulled rearwardly and lever 35 rocked so as to shift clutch member 98 to the right (Figure 3) and couple gear 96 to the countershaft.

Gear 96 meshes with a helical gear 108 supported by the differential carrier in novel manner, as will now be described. Casing A is provided with a bore 109, in which a bearing 111 is mounted. Cover C is provided with a cylindrical shell-like extension 112 which supports a mating bearing 113. As seen in Figure 3 shell 112 is reinforced by web portions 114, which join it to support 85.

Mounted for rotation in bearings 111 and 113 is a two-part differential carrier made up of sections 115 and 116, secured together along a joint 117 by a plurality of cap screws 118. In order to further reduce the size of the mechanism, gear 108 is offset from the enlarged portions of the differential housing and has a journal fit with a cylindrical surface 119 on carrier section 116. The gear engages a shoulder 121 on the carrier and is restrained against axial displacement by a split ring 122 sprung into a groove 123 located in carrier section 116. Gear 108 is preferably restrained against rotation with respect to the carrier by means of a plurality of keys 124 fitting into recesses in the carrier and seating in keyways in the gear.

Power is transmitted from the carrier to a pair of axle shafts 125 and 126, by means of a pair of differential gears 127 and 128 journalled in the carrier and splined to the axle shafts. Gears 127 and 128 mesh with differential spider gears 129 carried by a differential spider 131 secured between the carrier sections in well-known manner.

Although the axle has been shown for a right-hand drive, with the propeller shaft located to the right-hand side of the center line of the vehicle, and with the spring seat secured to portion 43 of the cover, it is to be understood that; if desired, the axle may be employed in a left-hand drive by merely properly adjusting the length of arms 42 and 43 and securing the spring seat to sleeve 41 of housing A. It is also to be understood that, although the axle has been disclosed as a front drive axle, it may obviously be used to advantage as a rear drive axle, particularly when the clearance in the rear of the vehicle is too small to permit a conventional single reduction rear axle to be used.

The axle is preferably constructed and assembled as follows.

The mating surfaces of housing A and the cover first are accurately machined. The housing sections are then accurately located by dowels 54, and rigidly secured together by screws 55. With the two parts of the housing rigidly fastened together, an arbor is projected through the differential bearing bores to locate a fixture for boring the seats for bearings 111 and 113, and also the interior of members 41 and 43. An arbor is then assembled in the cross-shaft openings and bearing seats 76 and 84 are bored, and the surfaces on the housing and cover against which the flanges of caps 78 and 86 seat are accurately faced off.

The pilot surface 62 in the nose end is then accurately bored and the surface against which the flange of auxiliary housing D bears is accurately faced off. The cover is then removed and the parts assembled as follows:

The shifter yoke is then installed from the interior of the housing A, with shaft portion 36 projecting into the opening 103. Bushing 104 is then forced into place and lever 35 applied, and stop pins 105 accurately located in the housing A.

The differential carrier assembly, including sections 115 and 116; the differential gears; and the gear 108, together with bearings 111 and 113, fully assembled as a unit, is then inserted in housing A, with bearing 111 fitting in surface 109. The cross-shaft 73, with all of its assembled parts including bearings 75 and 83, is then inserted in the housing with the outer race of bearing 75 located in bore 76.

Cover C is then fitted into place, with bearing 113 fitting in portion 112, and bearing 83 fitting in portion 85 of the cover, caps 78 and 86 preferably being left off until the final assembly. Cap screws 55 are then applied and the cover is rigidly pulled into place, it being understood that a predetermined number of shims are inserted between faces 51 and 52 to establish the proper running clearance in bearings 111 and 113.

The unit is now completely assembled, with gear 96 meshing with gear 108, and with the shifter yoke 104 engaging shifter collar 98. Caps 78 and 86 are then applied—a sufficient number of shims being placed under each flange to secure the proper axial adjusted position of the cross-shaft—and cap screws 79 and 88 are threaded home to rigidly lock the caps in place.

Housing D, containing bearings 58 and 59 and shaft 57, is then bolted in place on the main housing, with enough shims 64 in place to establish the proper mesh between the bevel pinion 71 and bevel gear 72. Locknut assembly 65 is then applied and adjusted to establish proper running clearance in bearings 58 and 59. Member 68, having seal assembly 69 mounted therein, is then secured to flange 66 by screws 67.

The axle is now completely assembled and all that is necessary to complete the installation in a vehicle is to connect up cable 33 with lever arm 35, secure the vehicle springs to member 43 of the cover and axle arm 42, and install axle shafts 125 and 126 in a manner well understood in the art.

Any desired gear ratios may be used in the axle, but they are preferably so proportioned that bevel gear 72 is substantially the same diameter as spur gear 108, so that a casing of substantially symmetrical oval shape in outline (Figure 5) may be used, and the overall reduction of the two sets of gears is equal to the reduction of the rear axle. In the present instance, there is a twenty-to-six (3⅓ to 1) reduction between pinion 71 and bevel gear 72, and a two-to-one reduction between spur gears 96 and 108, making a total or overall reduction of forty-to-six (6⅔ to 1) in the front axle. Therefore, by using a forty-to-six reduction between pinion 21 and bevel gear 22 in the rear axle, the front and rear axles are synchronized, and their input shafts 25 and 19 may be driven at the same speed by transfer case 15. Conversion may accordingly be readily made by determining the reduction of the rear axle in the vehicle to which the front drive axle is to be applied, and selecting front axle gears having an overall reduction equal to that of the rear axle.

The invention accordingly provides a double reduction axle of extremely rugged and compact construction, and since the axle housing assumes the form of oval or ellipse lying on its side in side elevation, it requires a minimum of over-axle clearance and road clearance, adapting it for installation in vehicles with a minimum of blocking up of the vehicle with respect to the plane of the axle shafts. Also, by off-setting gear 108 from the enlarged portion of the differential carrier and securing it in place by means of a snap ring and a pair of keys, the housing is further reduced in size and the structure simplified materially. Moreover, by permanently mounting the outer races of bearings 111 and 113 in the bosses in the housing and cover, expensive adjusting means are eliminated, it only being necessary to provide sufficient shims between the housing and the cover to provide the proper running clearance in the bearings. For instance, if it becomes necessary to take up clearance in the bearings due to wear in service, one or more shims may be removed between the cover and the housing, and cap 86 backed off sufficiently to compensate for the new position of the cover relative to the main housing, it being apparent that adjusting the cover with respect to the housing has no effect upon the mesh of the pinion and bevel gear, since they are both carried by the main housing. Also, the new construction embodies less parts and it is more economical to manufacture than the types of axles in which the cross-shaft and bevel pinions are incorporated in a separate carrier structure bolted on the main housing, and yet the unit is sturdy, efficient and has a long life.

The modified form of axle shown in Figure 6 is constructed somewhat in the same manner and embodies most of the parts of the axle just described, the major difference residing in a redistribution of the parts with respect to the center line of the input shaft, and accordingly like reference characters with the subscript "a" have been applied to corresponding or similar parts.

Cover C is secured to the casing A in the same manner as the axle just described, and axle arms 42a and 45a are carried by the housing and cover respectively. The housing is provided with external strengthening webs 46a and additional internal webs 141 for reinforcing the housing against distortion in response to stresses developed therein during operation of the axle.

Input shaft 57a is journalled in auxiliary housing D secured to housing A, and meshes with a bevel gear 72a carried by cross-shaft 73a. The cross-shaft assembly is somewhat different than the one previously described, and it embodies a reduced end 142 journalled in a bearing 143 carried in shell-like extension 144 of housing A, and having an abutment wall 145 for the outer race of the bearing. A plurality of shims 146 are interposed between wall 145 in the outer race of the bearing for properly locating the axial position of the cross-shaft. The inner race of the bearing is secured on the shaft by a nut 147. A port 148 is provided in housing A and closed by a cover 149 pressed in place. Opening 148 is provided to facilitate boring of the various cross-shaft bearings and abutment surfaces, and is permanently closed after the axle is assembled.

Bevel gear 72a is pressed on the cross-shaft with a tapered spline connection 93a as before, but in this instance it abuts bearing 143.

The other end of the cross-shaft is provided with a reduced portion 151 journalled in a bearing 152 carried in a bore 153 in the cover. A closure 154 engages the outer race of bearing 152, and, through the use of a plurality of shims 155, accurately holds it in proper axial adjusted position. The cap is held in place by cap screws 156. The inner race of bearing 152 abuts an enlarged portion 157 on the cross-shaft, and a spur gear 96a is journalled between the hub of gear 72a and the enlarged portion. The enlarged portion of the cross-shaft carries external teeth 95a, and clutch collar 98a and cooperates therewith and with external teeth 97a on gear 96a to selectively couple gear 72a to the cross-shaft, as previously described. In this instance, however, lever 135a must be rotated counter-clockwise to engage the clutch, and is therefore illustrated in phantom lines in Figure 6 as extending to the left of the pivot so that, when cable 33a is pulled, the yoke will force the clutch collar to the left, into engagement with teeth 97a.

In this form of the invention, the parts are disposed further to the right of the pinion axis than in the first form of the invention, and therefore gear 108a is carried by an enlarged portion 158 of the differential carrier section 116a spaced to the right of the enlarged portion of the carrier. The gear is held in place by a snap ring 122a against a shoulder 121a as previously described.

In view of the rearrangement of the parts the bearing support 112a is somewhat shorter and lies adjacent to the plane of the cover.

This form of the invention functions in the same way as previously described, and by disposing gear 108a to the right rather than to the left of bevel gear 72a, the left-hand portion of housing A may be of somewhat smaller diameter than the first form of the invention because it can be brought down into close proximity to the enlarged portion of the differential carrier. Also, disposing clutch collar 98a to the right rather than to the left of the axis of shaft 57, the casing, in the region of the left-hand end of the cross-shaft, may also be of smaller size. This construction is accordingly adapted for installations in which clearances are extremely limited adjacent the center line of the vehicle.

Figures 7, 8:
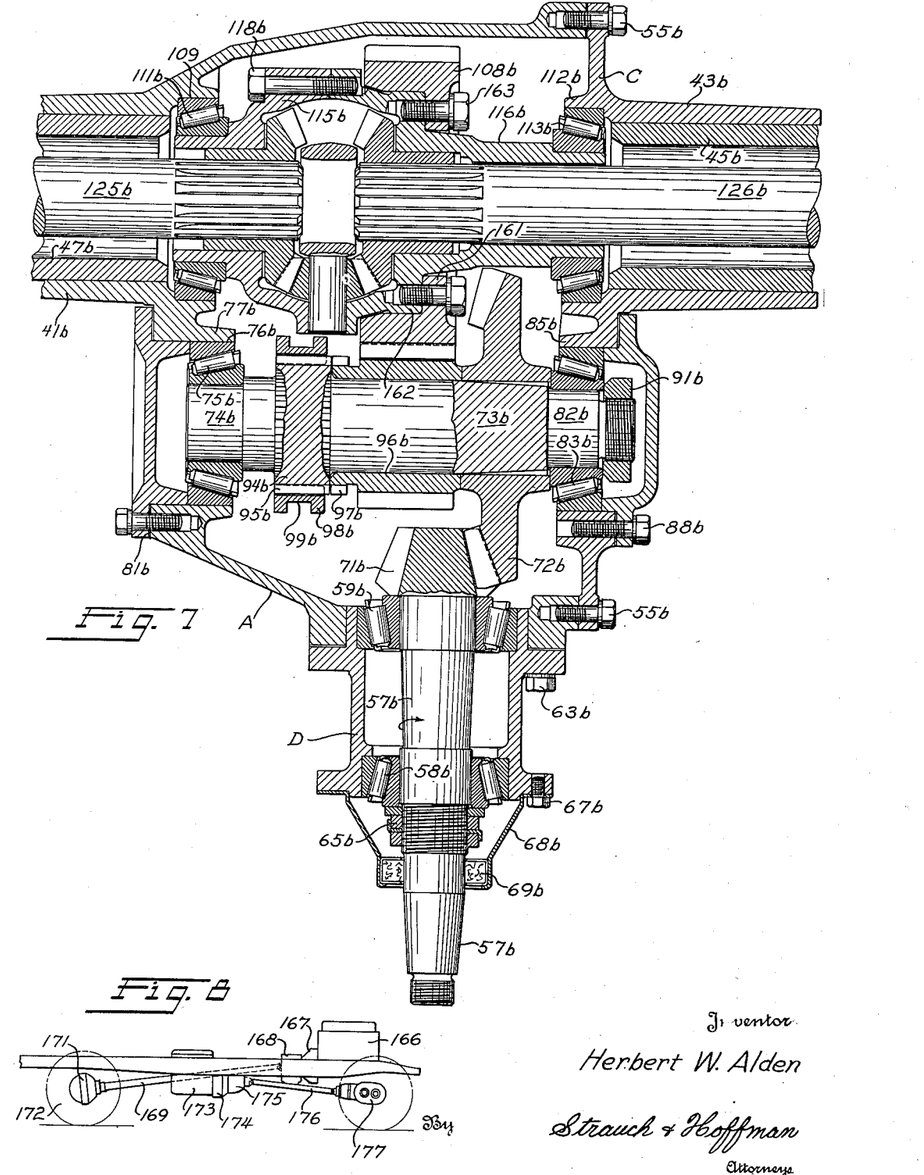
Figure 7 is a view similar to Figure 6 and shows a further modified form of drive axle of the invention.
Figure 8 is a diagrammatic view of a motor vehicle embodying a further modification of the invention.

In Figure 7 a further modification of the invention is disclosed, which is somewhat similar to that first described, the major difference residing in the fact that the input shaft is designed to be rotated in the opposite direction to effect forward rotation of the vehicle wheels.

With continued reference to this figure, in which subscripts "b" have been applied to reference characters denoting parts which are similar or the same as those of the previously described forms of the invention, the cover is secured to the main housing in the manner previously described, and auxiliary housing D carries input shaft 57b in bearings 58b and 59b. In this form of the invention, pinion 71b meshes with a bevel gear 72b, but the latter faces to the left rather than to the right as shown in Figure 3, with the result that the drive shaft 57b must be rotated in the opposite direction (indicated by the arrow) in order to transmit the power in the proper direction and effect forward rotation of drive axles 125b and 126b. Gear 72b is secured to cross-shaft 73b, and the latter is mounted for rotation in bearings in the housing and cover, very much in the same manner as that shown in Figure 3. The major difference resides in the fact that support 85b for bearing 83b need not be extended so far into the housing, because of the relocation of gear 72b.

The clutch operating mechanism is constructed and operates in the same manner as that shown in Figure 3, and therefore has not been illustrated.

Gear 108b in this instance is provided with a flange 161 which is secured to a boss 162 on section 116b of the differential carrier by a plurality of cap screws 163, but it is to be understood that, if desired, the securing means shown in Figures 3 and 6 may be employed without departing from the spirit of the invention.

The operation of this form of the invention is the same as that previously described except, as just pointed out, shaft 57b must be rotated in the opposite direction from the other two forms of the invention, and this axle is designed particularly for multi-engined vehicles of the character diagrammatically shown in Figure 8.

Referring to Figure 8, the vehicle is provided with a forwardly mounted conventional internal combustion engine 166 which drives a clutch 167, a transmission 168, and a propeller shaft 169. Propeller shaft 169 is connected to a single reduction rear axle 171, which may be of the type described in connection with Figure 1, and drives rear vehicle wheels 172.

A second engine 173, preferably of smaller torque capacity than engine 166, is located amidships, and faces in the opposite direction. Engine 173 therefore rotates in the opposite direction to engine 166. Engine 173, through a clutch 174 and a transmission 175, drives a propeller shaft 176 connected to a front drive axle 177 which is preferably of the type shown in Figure 7, and just described. The various controls of the two engines are preferably interconnected in the manner shown in the application of Beverly W. Keese and Arthur J. Hazen, Serial No. 356,214 filed September 10, 1940, and, as they do not form a part of this invention and are not claimed herein, they will not be further described.

This vehicle may be operated with either the main engine alone, or with the main and auxiliary engines operating simultaneously, depending upon the load and road conditions. When the main engine is operating alone, clutch collar 98b will be shifted into the position shown in Figure 7, to disengage the clutch and uncouple the front wheels of the vehicle. When it is desired to drive the vehicle with both motors, clutch 98b is shifted to the right to couple shaft 57b to the front axle and thereby effect a four-wheel drive.

Although the invention has been illustrated as embodied in a four wheel drive vehicle, it is to be understood that it may also be advantageously utilized in multi-wheel vehicles, in which two rear drive axles are employed, without departing from the invention.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. In a drive axle, a housing; a drive shaft journalled in said housing and carrying a bevel pinion on one end thereof; a driven member mounted in said housing substantially normal to said drive shaft and having a bevel gear meshing with said bevel pinion, said driven member having a reduced cylindrical portion projecting beyond said bevel gear and intersecting the axis of rotation of said drive shaft; and an anti-friction bearing having inner and outer races and interposed rolling elements, mounted in said housing and supporting the reduced end of said driven member, the inner race of said bearing being disposed substantially symmetrically with respect to the axis of said drive shaft and located closely adjacent the hub of said bevel gear.

2. In a drive axle, a housing; a drive shaft journalled in said housing and carrying a bevel pinion on one end thereof; a driven member mounted in said housing substantially normal to said drive shaft and having a bevel gear meshing with said bevel pinion, said driven member having a reduced cylindrical portion projecting beyond said bevel gear and intersecting the axis of rotation of said drive shaft; a cylindrical portion on said housing surrounding the cylindrical portion of said driven member and intersecting the axis of rotation of said drive shaft; and an anti-friction bearing interposed between the cylindrical portions of said driven member and said housing.

3. In a drive axle, a housing; a drive shaft journalled in said housing and carrying a bevel pinion on one end thereof; a driven shaft mounted in said housing substantially normal to said drive shaft and having a bevel gear meshing with said bevel pinion, said driven shaft having a reduced portion projecting beyond said bevel gear and intersecting the axis of rotation of said drive shaft; a cylindrical shell-like portion on said housing surrounding the reduced portion of said driven member and intersecting the axis of rotation of said drive shaft; and an anti-friction bearing interposed between the cylindrical portions of said driven member and said housing.

4. In a drive axle, a housing comprising a pair of mating housing sections, each having an axle arm rigidly projecting therefrom; means for securing said sections together along a plane disposed substantially normal to said axle arms; an axle shaft rotatable in each axle arm; a differential mechanism including a carrier mounted for rotation in said housing adjacent said axle arms and connected to said axle shafts; a countershaft journalled in said housing about an axle substantially parallel to said axle shafts, a longitudinally disposed drive shaft projecting into said housing; a bevel pinion on said drive shaft meshing with a bevel gear on said countershaft; a gear on said countershaft meshing with a gear on said carrier; said countershaft, said carrier and said gears being disposed in one of said housing sections; bearings in said one section for supporting one end of said carrier and countershaft; bearings in the other of said sections for supporting the other end of said carrier and said countershaft, and bearings carried by said housing for supporting said drive shaft.

5. In a drive axle, a housing comprising a pair of mating housing sections, each having an axle arm rigidly projecting therefrom; means for securing said sections together along a plane disposed substantially normal to said axle arms, and with the latter disposed in axial alignment with each other; an axle shaft rotatable in each axle arm; a differential mechanism including a carrier mounted for rotation in said housing adjacent said axle arms and connected to said axle shafts; a countershaft journalled in said housing about an axis parallel to said axle shafts, a longitudinally disposed drive shaft projecting into said housing; a bevel pinion on said drive shaft meshing with a bevel gear on said countershaft; a spur gear on said countershaft meshing with a spur gear on said carrier; means for selectively coupling said spur gear to said countershaft, said countershaft, said carrier and said gears being disposed in one of said housing sections; bearings in said one section for supporting one end of said carrier and countershaft; bearings in the other of said sections for supporting the other end of said carrier and said countershaft, and bearings carried by said one section for supporting said drive shaft.

6. In a drive axle, a housing comprising a deep casing section and a mating cover section, each section having an axle arm rigidly projecting therefrom; means for securing said sections together along a plane disposed substantially normal to said axle arms, an axle shaft rotatable in each axle arm; a differential mechanism including a carrier mounted for rotation in said housing adjacent said axle arms and connected to said axle shafts; a countershaft journalled in said housing about an axis parallel to said axle shafts, an auxiliary housing secured to said casing section; a longitudinally disposed drive shaft journalled in said auxiliary housing and projecting into said casing section and disposed in a substantially common plane with said counter and axle shafts; a bevel pinion on said drive shaft meshing with a bevel gear on said countershaft; a spur gear on said countershaft meshing with a spur gear on said carrier, said countershaft, said carrier and said gears being disposed in said casing section, bearings in said casing section for supporting one end of said carrier and countershaft; and bearings in said cover section for supporting the other end of said carrier and said countershaft.

7. In a drive axle, a housing comprising a pair of mating housing sections of generally elliptical form in transverse elevation each section having an axle arm rigidly projecting therefrom; one section being formed as an open sided casing and the other section forming a cover therefor; means for securing said sections together along a plane disposed substantially normal to said axle arms, and with the latter disposed in axial alignment with each other; an axle shaft rotatable in each axle arm; a differential mechanism including a carrier mounted for rotation in said housing adjacent said axle arms; a countershaft journalled in said housing about an axis parallel to said axle shafts, a tubular housing secured to said casing section and disposed normal to said axle arms; a longitudinally disposed drive shaft journalled in bearings in said tubular housing and projecting into said casing section and disposed in a substantially common plane with said counter and axle shafts; a bevel pinion on said drive shaft meshing with a bevel gear on said countershaft; a spur gear on said countershaft meshing with a spur gear on said carrier, said countershaft, said carrier and said gears being disposed in said casing section, bearings in said casing for supporting one end of said carrier and countershaft; and bearings in said cover section for supporting the other end of said carrier and said countershaft.

8. In a drive axle, a transversely divided housing having a deep section and a shallow section, a countershaft assembly in said deep housing section and comprising a countershaft having an enlarged portion adjacent one end and an antifriction bearing disposed on one side of said enlarged portion and supported in said deep housing section; a bearing carried by the other end of said countershaft and supported in said shallow housing section; a bevel gear tightly fitting said shaft and abutting said last-named bearing; a spur gear journalled for free rotation on said countershaft and restrained against axial movement by said bevel gear and the other side of said enlarged portion of said countershaft, said spur gear having a series of clutch teeth adjacent said enlarged portion; a toothed clutch collar slidably mounted on said enlarged portion and having means for selectively coupling said spur gear to said countershaft, and a drive shaft journalled in said deep housing section and carrying a bevel pinion meshing with said bevel gear.

9. In a drive axle, a two part housing having a pair of oppositely projecting axle arms, said housing being divided on a plane disposed substantially normal to said axle arms into a casing section and a cover section, said casing section having a pair of cylindrical bearing seats aligned with a pair of cylindrical bearing seats in said cover section and disposed substantially parallel to said axle arms; a differential carrier and a cross-shaft journalled for rotation about substantially parallel axes in said pairs of bearing seats and having spur gear means for transmitting power therebetween; an axle shaft rotatably mounted in each axle arm; a cylindrical seat in said casing section disposed substantially normal to said axle arms; an auxiliary housing having a portion projecting into said last-named cylindrical seat and having a pair of aligned bearing seats disposed substantially normal to said axle arms; and a drive shaft journalled in said last-named bearing seats and having bevel gear means for transmitting power to said cross-shaft.

HERBERT W. ALDEN.